(12) United States Patent
Krig

(10) Patent No.: US 8,626,931 B2
(45) Date of Patent: Jan. 7, 2014

(54) MEDIA TRANSPORT PROTOCOL EXTENSIONS FOR SYSTEM INFORMATION EXCHANGE, AND APPLICATIONS THEREOF

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 948 days.

(21) Appl. No.: 11/967,990

(22) Filed: Dec. 31, 2007

(65) Prior Publication Data

US 2008/0189349 A1 Aug. 7, 2008

Related U.S. Application Data

(60) Provisional application No. 60/899,380, filed on Feb. 5, 2007, provisional application No. 60/899,402, filed on Feb. 5, 2007.

(51) Int. Cl.
*G06F 15/16* (2006.01)

(52) U.S. Cl.
USPC ............................................ 709/228; 710/17

(58) Field of Classification Search
USPC ............ 709/227, 228, 230, 200–202; 726/27; 710/15–19
See application file for complete search history.

(56) References Cited

U.S. PATENT DOCUMENTS

| | | | |
|---|---|---|---|
| 7,120,429 B2 | 10/2006 | Minear et al. | |
| 7,191,332 B1 | 3/2007 | Pankajakshan et al. | |
| 7,196,661 B2 | 3/2007 | Harvey | |
| 7,457,781 B1 | 11/2008 | Weaver et al. | |
| 7,484,103 B2 | 1/2009 | Woo et al. | |
| 7,493,289 B2 | 2/2009 | Verosub et al. | |
| 7,555,554 B2 | 6/2009 | Manders et al. | |
| 7,584,222 B1 | 9/2009 | Georgiev | |
| 7,747,533 B2 | 6/2010 | Zhang et al. | |
| 7,779,097 B2 | 8/2010 | Lamkin et al. | |
| 7,861,312 B2 | 12/2010 | Lee et al. | |

(Continued)

OTHER PUBLICATIONS

Office Action, dated Jan. 19, 2011, for U.S. Appl. No. 12/121,636, filed May 15, 2008, 15 pages.

(Continued)

*Primary Examiner* — Moustafa M Meky
(74) *Attorney, Agent, or Firm* — Sterne Kessler Goldstein & Fox PLLC

(57) ABSTRACT

Methods, systems and computer program products to implement extensions of the Media Transport Protocol (MTP) are provided herein. The methods include opening a session between an initiator and a responder, exchanging one or more of device and system information and sending one of an operation or event based on media player application features. The operation includes one or more of a dataset, response code, operation parameter and response parameter. In an embodiment, the extensions enable the initiator and responder to manage connections efficiently between devices, send media player application information to a media player device, exchange device and system information, manage digital rights, monitor system security and specify properties within one or more extensions of MTP. These extensions may be in the form of one or more of an operation, an event, a dataset or property code.

18 Claims, 14 Drawing Sheets

(56) References Cited

U.S. PATENT DOCUMENTS

| | | |
|---|---|---|
| 2002/0049679 A1* | 4/2002 | Russell et al. .................. 705/52 |
| 2002/0157002 A1 | 10/2002 | Messerges et al. |
| 2003/0028488 A1 | 2/2003 | Mohammed et al. |
| 2003/0032406 A1 | 2/2003 | Minear et al. |
| 2003/0131353 A1 | 7/2003 | Blom et al. |
| 2003/0135756 A1 | 7/2003 | Verma |
| 2004/0037288 A1 | 2/2004 | Bourgart et al. |
| 2004/0139315 A1 | 7/2004 | Tokutani et al. |
| 2004/0221044 A1* | 11/2004 | Rosenbloom et al. ........ 709/227 |
| 2004/0221163 A1 | 11/2004 | Jorgensen et al. |
| 2004/0249768 A1 | 12/2004 | Kontio et al. |
| 2005/0010531 A1 | 1/2005 | Kushalnagar et al. |
| 2005/0268343 A1 | 12/2005 | Onoda et al. |
| 2006/0021012 A1 | 1/2006 | Ito |
| 2006/0053080 A1 | 3/2006 | Edmonson et al. |
| 2006/0107046 A1 | 5/2006 | Raley et al. |
| 2006/0149683 A1 | 7/2006 | Shimojima et al. |
| 2006/0195864 A1 | 8/2006 | New et al. |
| 2006/0253874 A1 | 11/2006 | Stark et al. |
| 2006/0253894 A1 | 11/2006 | Bookman et al. |
| 2006/0265758 A1 | 11/2006 | Khandelwal et al. |
| 2007/0106551 A1 | 5/2007 | McGucken |
| 2007/0136204 A1 | 6/2007 | Oh et al. |
| 2007/0198430 A1 | 8/2007 | Takahashi et al. |
| 2007/0206799 A1 | 9/2007 | Wingert et al. |
| 2007/0208668 A1 | 9/2007 | Candelore |
| 2008/0082813 A1* | 4/2008 | Chow et al. ...................... 713/2 |
| 2008/0086779 A1 | 4/2008 | Blake et al. |
| 2008/0092211 A1* | 4/2008 | Klemets et al. .................... 726/3 |
| 2008/0120242 A1* | 5/2008 | Krig et al. ...................... 705/59 |
| 2008/0127351 A1 | 5/2008 | Jang et al. |
| 2008/0189348 A1 | 8/2008 | Krig |
| 2008/0282316 A1 | 11/2008 | Sonoda et al. |
| 2008/0288788 A1 | 11/2008 | Krig |
| 2009/0083429 A1 | 3/2009 | Krig |
| 2009/0150293 A1 | 6/2009 | Yen et al. |

OTHER PUBLICATIONS

Office Action, dated Jun. 11, 2010, for U.S. Appl. No. 11/967,969, filed Dec. 31, 2007, 17 pages.
Office Action, dated Jan. 3, 2011, for U.S. Appl. No. 11/967,939, filed Dec. 31, 2007, 5 pages.
Office Action, dated Jun. 21, 2011, for U.S. Appl. No. 11/967,939, filed Dec. 31, 2007, 5 pages.
Office Action, dated Aug. 29, 2011, for U.S. Appl. No. 12/121,636, filed May 15, 2008, 14 pages.
Office Action, dated Aug. 17, 2011, for U.S. Appl. No. 11/967,939, filed Dec. 31, 2007, 6 pages.
Office Action, dated Jan. 19, 2012, for U.S. Appl. No. 12/121,636, filed May 15, 2008, 16 pages.
Office Action, dated Jul. 9, 2012, for U.S. Appl. No. 12/121,636, filed May 15, 2008, 16 pages.
Office Action, dated Feb. 3, 2012, for U.S. Appl. No. 12/121,639, filed May 15, 2008, 7 pages.
Office Action, dated Jul. 27, 2012, for U.S. Appl. No. 12/121,639, filed May 15, 2008, 8 pages.
Office Action, dated Jan. 10, 2012, for U.S. Appl. No. 11/967,939, filed Dec. 31, 2007, 6 pages.
Examiner's Answer to Appeal Brief, dated Jul. 16, 2012, for U.S. Appl. No. 11/967,939, filed Dec. 31, 2007, 7 pages.
Office Action, dated Feb. 12, 2013, for U.S. Appl. No. 12/121,636, filed May 15, 2008, 13 pages.
Office Action, dated Dec. 6, 2012, for U.S. Appl. No. 12/121,639, filed May 15, 2008, 7 pages.
Office Action, dated Apr. 1, 2013, for U.S. Appl. No. 12/121,639, filed May 15, 2008, 8 pages.
Office Action, dated Jul. 17, 2013, for U.S. Appl. No. 12/121,636, filed May 15, 2008, 15 pages.

* cited by examiner

MEDIA TRANSPORT PROTOCOL EXTENSIONS FOR SYSTEM INFORMATION EXCHANGE, AND APPLICATIONS THEREOF

CROSS-REFERENCE TO RELATED APPLICATIONS

This application claims the benefit of U.S. Provisional Application No. 60/899,402 filed Feb. 5, 2007 and U.S. Provisional Application No. 60/899,380 filed Feb. 5, 2007, both of which are incorporated herein by reference in their entirety.

BACKGROUND OF THE INVENTION

1. Field of the Invention

The present invention generally relates to multimedia communication.

2. Background Art

Currently, multiple protocols for the transfer of objects or media object such as audio, video, images and text are in use, one of them being the media transfer protocol (MTP). MTP is an extension of the industry standard picture transfer protocol (PTP). The media transfer protocol was created as an extension to the picture transfer protocol specifically for media devices and includes various provisions for digital rights management (DRM).

Current protocols may use digital rights management (DRM) and electronic license management technologies for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

However, current protocols such as MTP do not provide for exchange of media player management, firmware management, DRM management, security management of media objects and DRM licenses, system and device information management, device property management and efficient connections between an initiator and a responder.

Methods and systems are needed to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
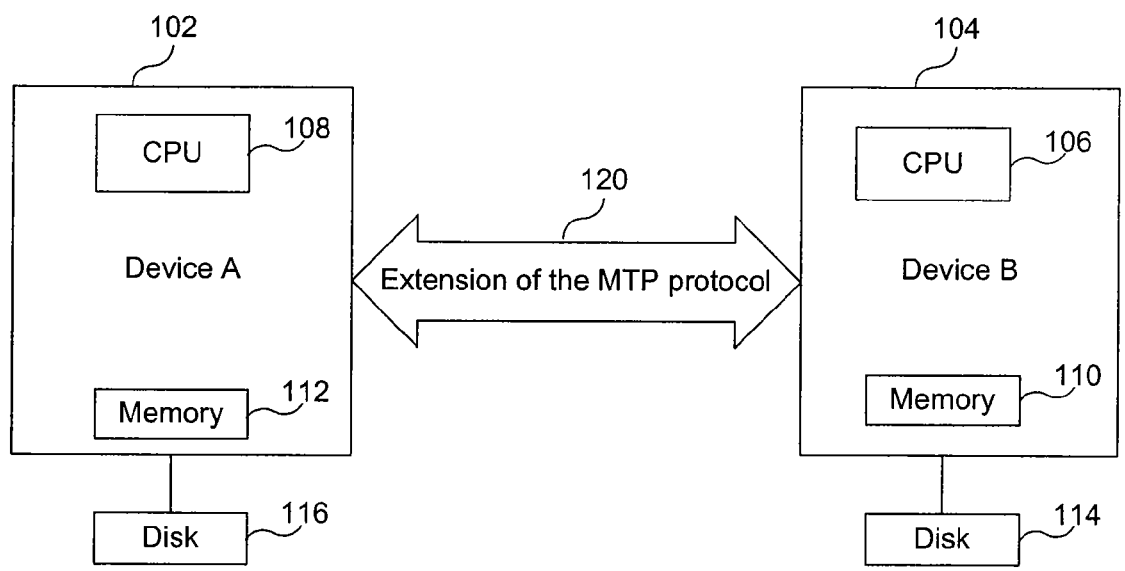
FIG. 1 is a block diagram of an exemplary system comprising a plurality of devices which are communicatively coupled and utilize one or more extensions of the MTP, in accordance with an embodiment of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

TABLE OF CONTENTS

1. Overview
2. The Media Transport Protocol
3. An Example Operating Environment
4. Managing connections efficiently between an initiator and a responder
5. Extensions for PC Based Media Player Application Features
6. Extensions for Object Integrity Tests and Digital Rights Management
7. Extensions for System Information exchange
8. Extensions for Properties
9. Extensions for Security, Integrity and Protocol checks
10. Example General Purpose Computer System
11. Conclusion

1. OVERVIEW

The present invention provides apparatus and methods for extensions to protocols including but not limited to the media transfer protocol (MTP). Aspects of the method and system may comprise managing connections efficiently between devices, sending media player application information to a media player device, exchanging device and system information, managing digital rights, monitoring security and specifying properties within one or more extensions of MTP. These extensions may be in the form of one or more of an operation, an event, a dataset or property code.

An operation as referred to herein may be sent by an initiator (as described below with reference to FIG. 1) or responder (described below with reference to FIG. 1). An operation either requests information or provides information in the form of a dataset or property. An operation may include but is not limited to an operation code field (arbitrary value based on design), multiple operation parameters fields, a data field that may include an optional dataset, a field for response code and a plurality of response parameters. The data direction field indicates the direction of data transfer, either from an initiator to a responder or from a responder to an initiator. Response codes include but are not limited to "OK" which indicates that the recipient of the operation accepts the operation, "parameter not supported" which indicates the either an operation or response parameter is not supported, "operation not supported" which indicates that the operation is not supported, "session not open" which indicates that a session is not open, "invalid transaction identification" which indicates that the transaction identification is invalid and "device busy" which indicates that the recipient of the operation is currently unavailable to service the requested operation.

An event as referred to herein may be sent by an initiator or responder and may include but is not limited to a field for event code, multiple fields for event parameters and a data field that may include an optional dataset. An event is used to notify of a change in status of the sending entity.

A property as referred to herein may be sent by an initiator or a responder and may include but is not limited to fields such as a "property code" that identifies the property, "data type" that indicates the data type of the property, "get/set" which indicates whether the responder is to return a value or set a value, "default value" which indicates the default value of the property, "group code" which indicates the group identifier and "form flag" which may be set by the sender of the property.

A dataset as referred to herein may be sent by an initiator or a responder and may include but is not limited to fields such as a "dataset field" that indicates the type of data, a "field order" that indicates the order of the type of data in the dataset, a "length" field that indicates the size of the data and a "datatype" field that indicates the data type of the data.

In an embodiment, each entry under the "dataset field" may be represented by a property, thus a dataset may alternatively be represented as multiple distinct properties. In embodiments, initiators and responders may exchange either entire datasets described herein or individual entries under the dataset field of a dataset that have been encapsulated as properties. For example, with reference to media player application information dataset in table, the "Manufacturer" entry may be represented by a "Manufacturer" property. Thus if only manufacturer information is needed, the manufacturer property can be sent instead of the entire dataset in table 3.

It is to be appreciated that the choice of fields to be included in operations, events and datasets to accomplish the methods described herein are a design choice and may be arbitrary.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. THE MEDIA TRANSFER PROTOCOL (MTP)

The media transfer protocol (MTP) is an extension of the industry standard picture transfer protocol (PTP). The media transfer protocol was created as an extension to the picture transfer protocol specifically for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. Exemplary transports include USB (Universal Serial Bus), IEEE 1394, and IrDA (Infrared Data Association).

Behavior requirements for DSPDs include: baseline features a device needs to support to provide interoperability over conforming transports; functional requirements needed by a transport to enable the creation of a transport-dependent implementation specification that conforms to this standard; and a high-level protocol for communicating with and between DSPDs consisting of operation, data, and response phases.

3. EXAMPLE OPERATING ENVIRONMENT

FIG. 1 is a block diagram of an exemplary system comprising a plurality of devices which are communicatively coupled and utilize one or more extensions of the MTP, in accordance with an embodiment of the invention.

Referring to FIG. 1 there is shown one or more extensions of the MTP 120 that facilitates communication between a device 102 and a device 104. Extensions 120 may be in the form of one or more of an operation, event or dataset. The system illustrated in FIG. 1 enables a method for transferring extensions 120 of the Media Transfer Protocol (MTP) to and from device 102, which may be a host computer, and device 104 which may be a hand-held device.

The device 102 may comprise suitable logic, circuitry and/or code that may enable transfer of information to and from the device 104 via MTP and at least one extension of the MTP 120. In one embodiment of the invention, the device 102 may be a host computer referred to in MTP specifications as an "initiator", and that may handle the extensions 120 while exchanging for example, media content and messages with the device 104. Media content may be referred to as an "object" or "media object" herein and includes but is not limited to video, audio, images, e-books and any other type of data.

The device 104 may comprise suitable logic, circuitry, and/or code that may enable the transfer of information to and from the device 102 via the MTP and at least one extension of the MTP. In one embodiment of the invention, the device 104 may be a hand-held device referred to in the MTP specification as a "responder", and that may handle the extensions 120 while exchanging, for example, media content and messages with the device 102.

4. EXAMPLE EMBODIMENT OF AN EFFICIENT CONNECTION BETWEEN AN INITIATOR AND A RESPONDER

Figure 2A:
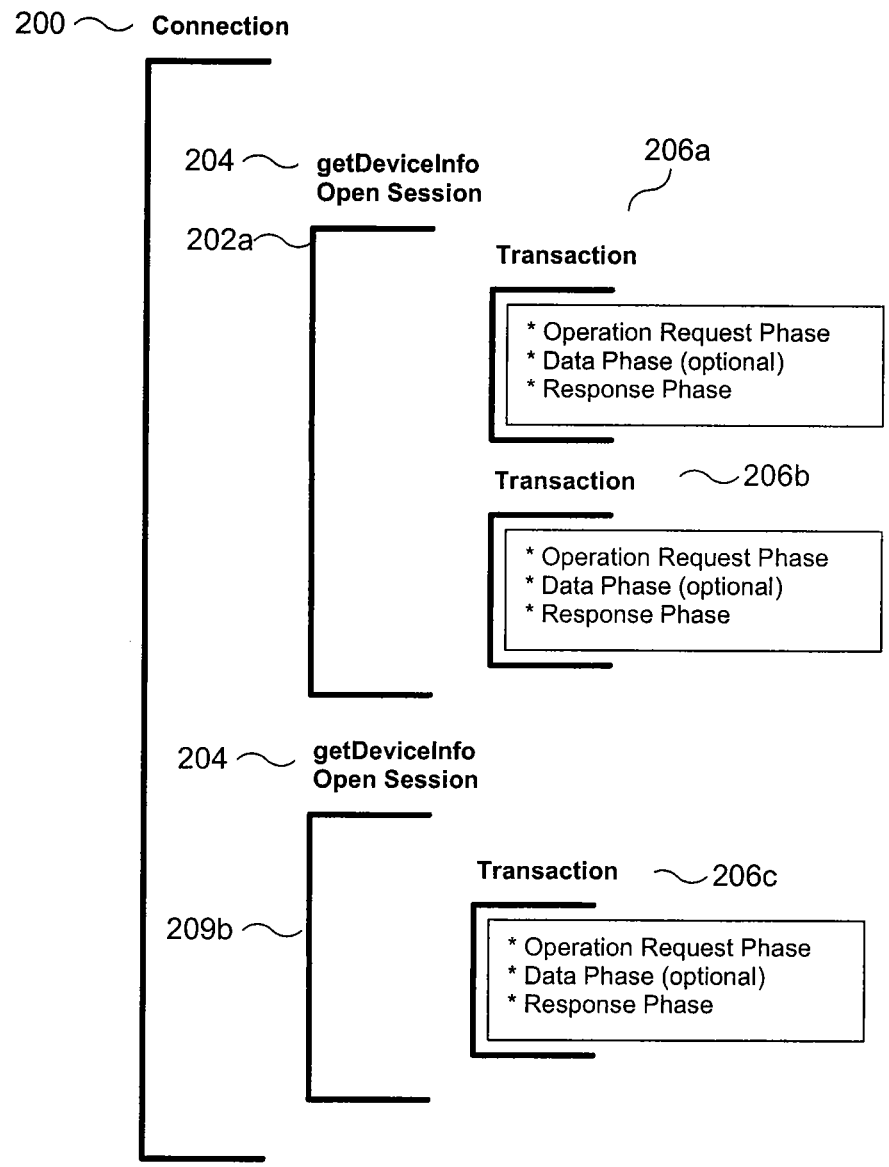
FIG. 2A illustrates a conventional connection between an initiator and a responder.

FIG. 2A illustrates a conventional connection 200 between initiator 102 and responder 104. Connection 200 between initiator 102 and responder 104 may be via a physical or a wireless medium including but not limited to Universal Serial Bus (USB), Wireless Fidelity (WiFi), Bluetooth, Transport Control Protocol/Internet Protocol (TCP/IP), Infrared Data Association (IrDA). During the life of connection 200, initiator 102 and responder 104 communicate by opening sessions 202*a*-*b* and conducting transactions 206 within open sessions 202. A "transaction" between initiator 102 and responder 104 comprises one or more of an operation, an event and a response. The response may be in the form of an operation or event. In a conventional connection 200 as illustrated in FIG. 2A, initiator 102 and responder 104 exchange system and device information 204 prior to each session 202. This is inefficient due to the redundant device and system information 204 exchange prior to each session 202.

Figure 2B:
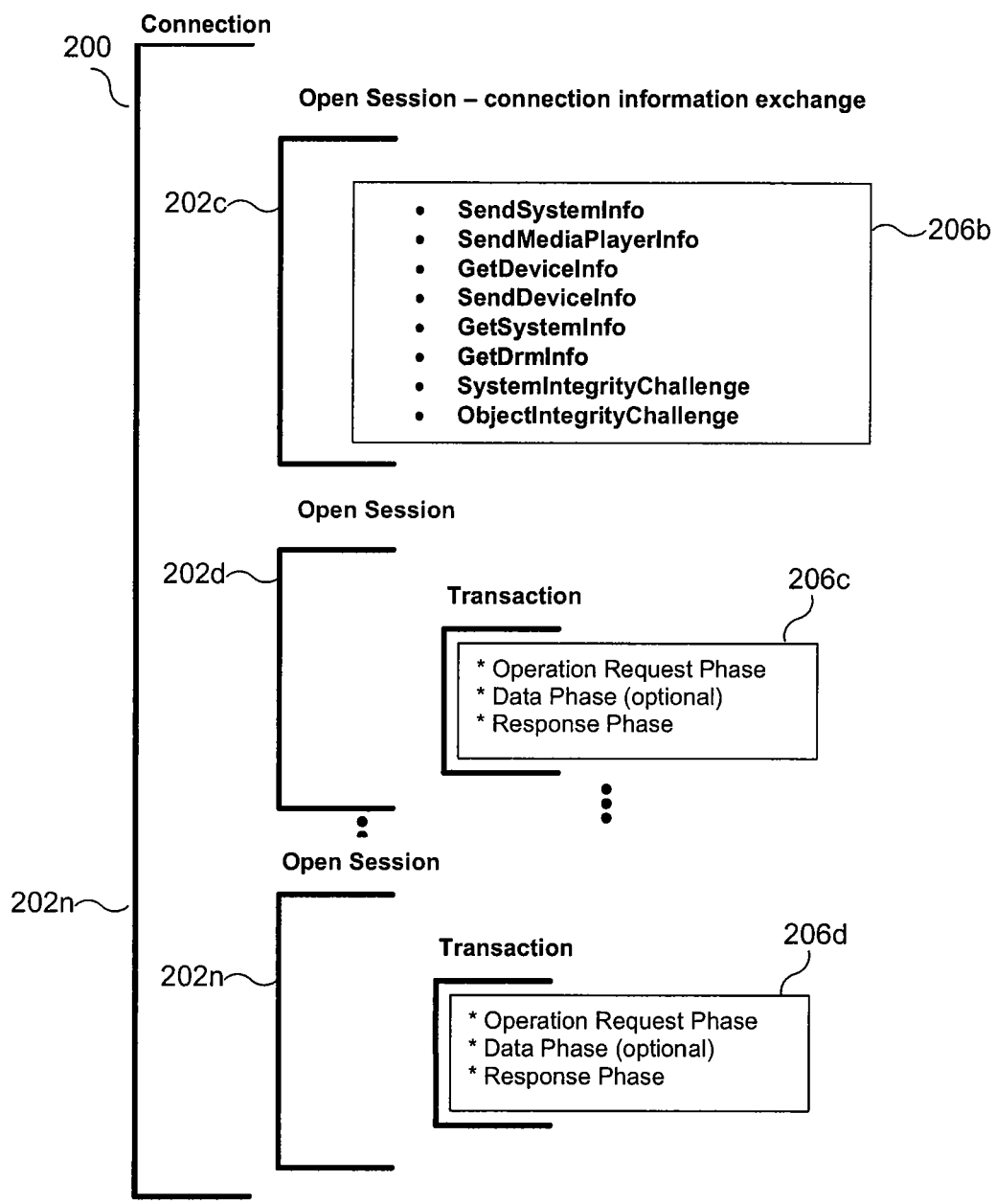
FIG. 2B illustrates an example connection according to an embodiment of the invention.

FIG. 2B illustrates an example connection 202 according to an embodiment of the invention. In the present embodiment, device and system information 204 is exchanged in the first session 202*c* between initiator 102 and responder 104. After the exchange of device and system information 204 in first session 202*c*, further sessions 202*d*-202*n* can be conducted without re-exchanging device and system information 204. As a result the overhead of exchanging device and system information 204 at the start of each session 202 is eliminated thereby significantly reducing overhead and speeding up transactions 206 between initiator 102 and responder 104. Another advantage of the present embodiment is that exchanging device and system information 204 at the start of connection 202 allows responder 104 to learn limitations of initiator 102 and configure its internal programs (running on processor 106) accordingly. In an embodiment, responder 104 may disclose to initiator 102 certain predetermined operations, events and properties based on a version of an operating system or media player application running on processor 108 of initiator 102.

In an embodiment, subsequent to a disconnection that terminates connection 202, initiator 102 and responder 104 again exchange system and device information 204 at the start of a new connection (not shown). In this case, initiator 102 and responder 104 re-exchange information in the event that either initiator 102 or responder 104 has changed hardware configuration or software during the connection due to, for example, a system and/or software change/upgrade.

Figure 2C:
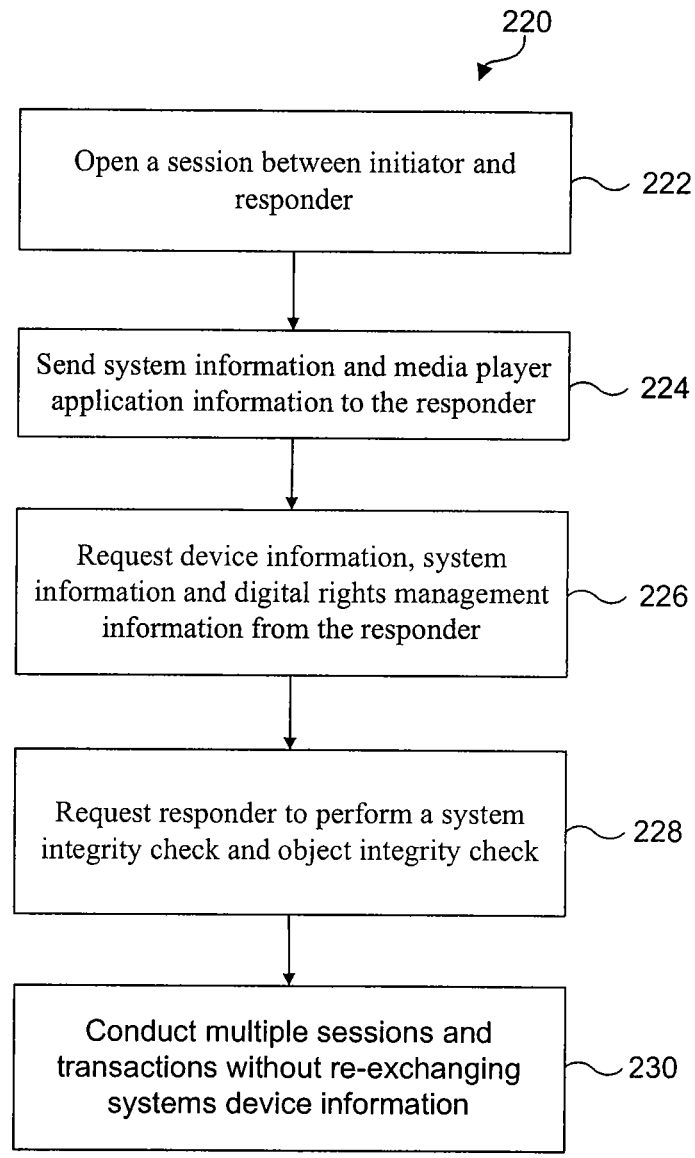
FIG. 2C illustrates an example flowchart illustrating initial steps performed during a connection between an initiator and a responder according to an embodiment of the invention.

FIG. 2C illustrates an example flowchart 220 illustrating initial steps performed during a connection between an initiator 102 and a responder 104 according to an embodiment of the invention.

In step 222, subsequent to establishing a connection between an initiator and responder, a session is opened between the initiator and the responder. For example, after a connection 202 is established, a session 202*c* is opened between initiator 102 and responder 104.

In step 224, the initiator sends information and media player application information to the responder. For example, initiator 102 sends system information and media player application information 204 to responder 104.

In step 226, the responder requests device information, system information and digital rights management information from the responder. For example, initiator 102 requests device information, system information and digital rights management information from the responder 104.

In step 228, the initiator requests the responder to perform system integrity check and an object integrity checks. For example, initiator 102 requests responder 104 to perform system integrity checks and object integrity checks. Examples of system integrity check and object integrity check operations are described in further detail below with reference to FIGS. 4A and 5B.

In step 230, multiple sessions and transactions are conducted between initiator and responder without re-exchanging device and system information for the duration of the connection established in step 222. For example, multiple sessions 202 and multiple transactions 204 are conducted between initiator 102 and responder 104 for the duration of connection 202.

5. EXTENSIONS FOR PC BASED MEDIA PLAYER APPLICATION FEATURES

Figure 3A:
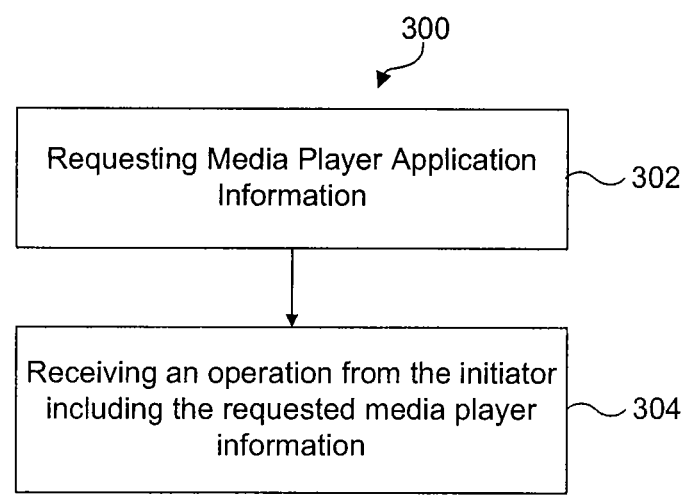
FIG. 3A illustrates an example flowchart illustrating steps performed to exchange media player application information between an initiator and a responder according to an embodiment of the invention.

FIG. 3A illustrates an example flowchart 300 illustrating steps performed to exchange media player application information between an initiator 102 and responder 104 according to an embodiment of the invention.

In step 302 a responder sends an event to initiator requesting media player application information. For example, responder 104 requests initiator 102 to provide information about a media player application running on processor 108. Table 1 illustrates an example event code sent from the responder to the initiator requesting information. In an embodiment, responder 104 may include optional event parameters.

TABLE 1

| | |
|---|---|
| Event Code | 0x00E1 |
| Event Parameter 1 | None |
| Event Parameter 2 | None |

In step 304, the initiator sends an operation to the responder that includes a dataset that has media player application information. For example, initiator 102 sends the operation shown in table 2 to responder 104.

TABLE 2

| | |
|---|---|
| Operation Code | 0x00F1 |
| Operation Parameter 1 | None |
| Data | Media Player Application Information Dataset |
| Data Direction | I->R |
| ResponseCode Options | OK, Parameter_Not_Supported |
| Response Parameter 1 | None |

The above operation includes a Media Player Application Information Dataset illustrated below in table 3 below. It is to be appreciated that the choice of dataset fields are a design choice and may be arbitrary.

TABLE 3

| Dataset field | Field order | Length (bytes) | Datatype |
|---|---|---|---|
| Manufacturer | 1 | variable | String |
| Version | 2 | variable | String |
| Serial Number | 3 | variable | String |

TABLE 3-continued

| Dataset field | Field order | Length (bytes) | Datatype |
|---|---|---|---|
| Model | 4 | variable | String |
| PC Media Player friendly name | 5 | variable | String |
| Operations Supported | 6 | variable | AUINT16 |
| Events Supported | 7 | variable | AUINT16 |

Figure 3B:
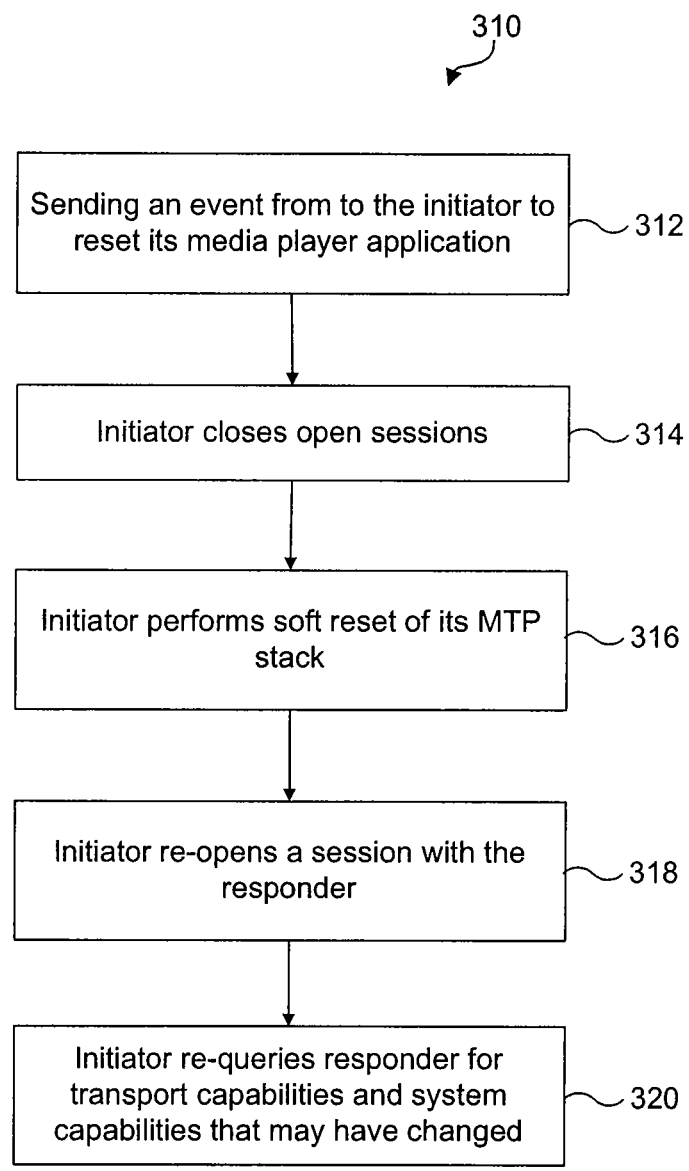
FIG. 3B illustrates a flowchart that shows steps performed during the reset of a personal computer based media player application.

FIG. 3B illustrates a flowchart 312 that shows steps performed during the reset of a personal computer based media player application.

In step 310, an event is sent to the initiator by the responder to reset its media player application. For example, responder 104 sends an event as shown below in table 4 to initiator 102 to reset a media player application running on a processor 108 off initiator 102.

TABLE 4

| Event Code | 0x00E2 |
|---|---|
| Event Parameter 1 | None |
| Event Parameter 2 | None |

In step 314, in response to receiving the event from the responder, the initiator closes all open sessions. For example, initiator 102 closes all open sessions 202 upon receiving the event in step 312 from responder 104.

In step 316, initiator performs a soft reset of its MTP stack. For example, initiator 102 performs a soft reset of its MTP stack running on processor 108.

In step 318, the initiator reopens a session with the responder. For example, in step 318 initiator 102 reopens a session 202 with responder 104.

In step 320 the initiator re-queries the responder for transport capabilities and system capabilities of the responder that may have changed. For example, initiator 102 re-queries responder 104 for changes in transport and system capabilities as a result of the MTP stack reset in step 316.

Figure 3C:
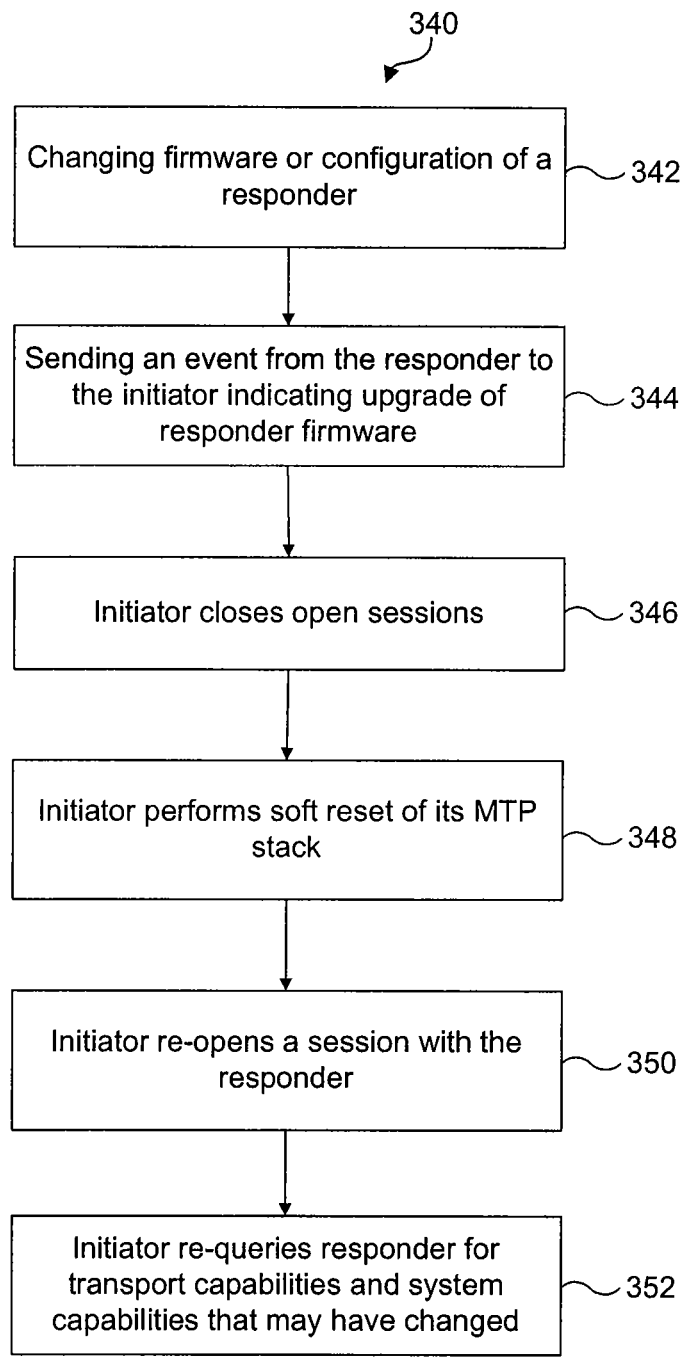
FIG. 3C illustrates an example flowchart illustrating steps performed during a firmware upgrade of a responder.

FIG. 3C illustrates an example flowchart 340 illustrating steps performed during a firmware upgrade of a responder.

In step 342 firmware of a responder is changed. For example, firmware of responder 104 may be changed or upgraded by initiator 102.

In step 344 the responder sends an event to the initiator indicating the firmware update. For example, responder 104 sends an event as shown in table 5 to initiator 102 indicating that its firmware has been changed or upgraded.

TABLE 5

| Event Code | 0x00E3 |
|---|---|
| Event Parameter 1 | None |
| Event Parameter 2 | None |

In step 346, the initiator closes all open sessions in response to receiving the event. For example, initiator 102 closes all open sessions 202 upon receiving the event in step 344 from responder 104.

In step 348 the initiator performs a soft reset of its MTP stack. For example, initiator 102 performs a soft reset of its MTP stack running on processor 108.

In step 350, the initiator reopens a session with the responder. For example, initiator 102 reopens a session 202 with responder 104.

In step 352, the initiator re-queries the responder for any changes in transport or system capabilities due to the firmware upgrade of the responder. For example, initiator 102 re-queries responder 104 for any changes in firmware or configuration of the responder 104 as a result of the firmware upgrade in step 342.

6. EXTENSIONS FOR OBJECT INTEGRITY TESTS AND DIGITAL RIGHTS MANAGEMENT

Figure 4A:
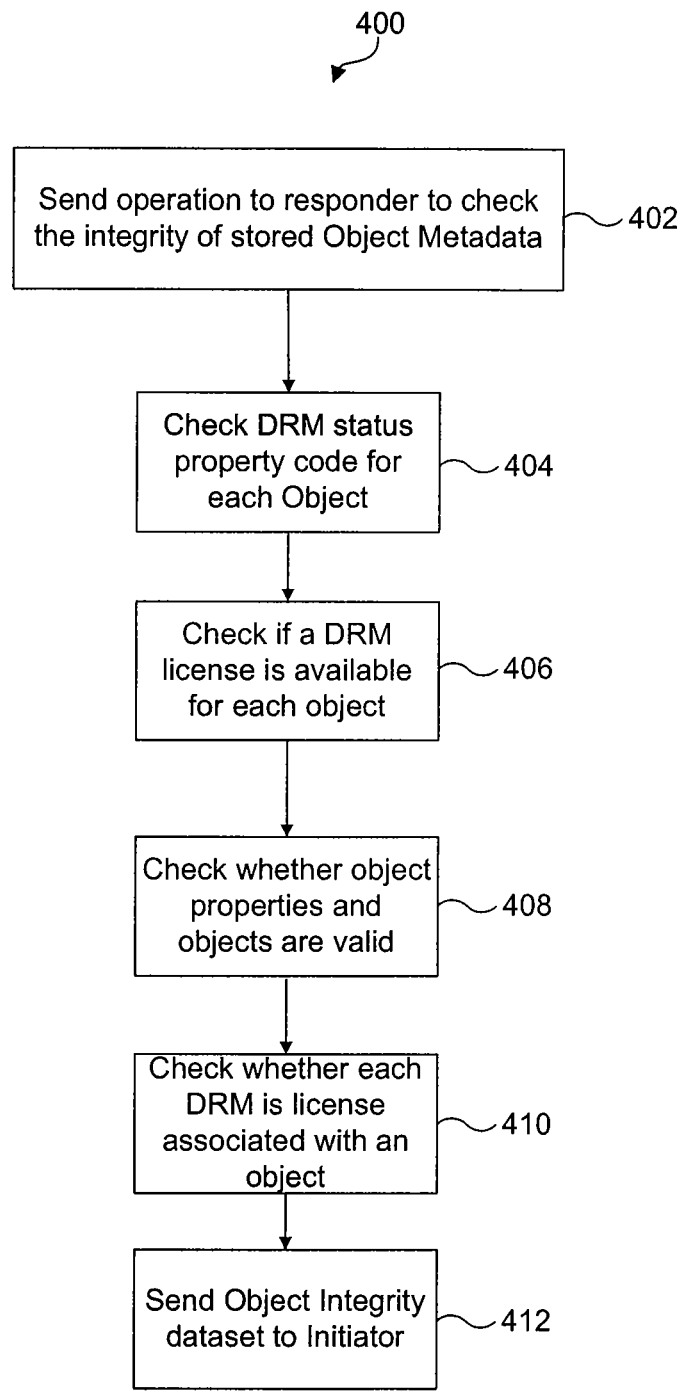
FIG. 4A illustrates an example flowchart showing steps performed to check the integrity of object metadata and digital rights management licenses according to an embodiment of the invention.

FIG. 4A illustrates an example flowchart 400 showing steps performed to check the integrity of object metadata and digital rights management licenses according to an embodiment of the invention.

In step 402, the initiator sends an operation to the responder to check integrity of object metadata and digital rights management licenses stored by a responder. For example, initiator 102 sends the operation shown in table 6 to responder 104 to check the integrity of stored object metadata and digital rights management licenses in memory 110 and/or disk drive 114 of responder 104. The operation in table 6 includes an Object Integrity dataset (shown in table 7) for the responder 104 to populate and return back to initiator 102.

TABLE 6

| Operation Code | 0x00F2 |
|---|---|
| Operation Parameter 1 | None |
| Operation Parameter 2 | None |
| Operation Parameter 3 | None |
| Operation Parameter 4 | None |
| Operation Parameter 5 | None |
| Data | ObjectyIntegrity dataset |
| Data Direction | R->I |
| ResponseCode Options | OK, Parameter_Not_Supported |
| Response Parameter 1 | None |
| Response Parameter 2 | None |
| Response Parameter 3 | None |
| Response Parameter 4 | None |
| Response Parameter 5 | None |

In step 404, the responder checks whether the digital rights management status code is set for each object stored in its memory and records the object identification for any offending objects in the object integrity dataset shown below in table 7. For example, responder 104 checks the item status code for each object stored in its memory 110 and/or disk drive 114 and records the object identifications for objects that do not have a DRM status property code set for each object.

TABLE 7

| Dataset field | Field order | Length (bytes) | Datatype |
|---|---|---|---|
| Count of orphaned DRM licenses | 1 | 4 | UINT32 |
| Array of orphaned DRM license ID's | 2 | variable | AUINT32 |
| Count of DRM protected Objects with no DRM license | 3 | 4 | UINT32 |
| Array of DRM protected ObjectID's with no DRM license | 4 | variable | AUINT32 |
| Count of Objects with corrupted Metadata property codes | 5 | 4 | UINT32 |
| Array of ObjectID's with corrupted Metadata property codes | 6 | variable | AUINT32 |

In step 406 the responder checks whether a digital rights management license is available for each object stored in its memory. For example, responder 104 checks whether a digital rights management license is available for each object stored in its memory 110 and/or disk drive 114 and records the object ID of objects that do not have a DRM license associated with them in table 7.

In step 408, the responder checks whether the object and associated object properties are valid for each object and associated object property stored in its memory. For example, responder 104 checks whether each object and each associated property is in its memory 110 and/or disk drive 114 and records the object identification for invalid or corrupt objects and/or associated object properties.

In step 410, the responder checks whether each DRM license stored in its memory is associated with an object and records a DRM license identification for DRM licenses that do not have an associated object. For example, responder 104 checks whether each DRM license stored in its memory 110 and/or disk drive 114 is associated with an object and records a digital rights management license identification for digital rights management licenses that are not associated with objects.

In step 412, the responder sends the object integrity database to the initiator. For example, responder 102 sends object integrity database in table 7 to initiator 102.

Figure 4B:
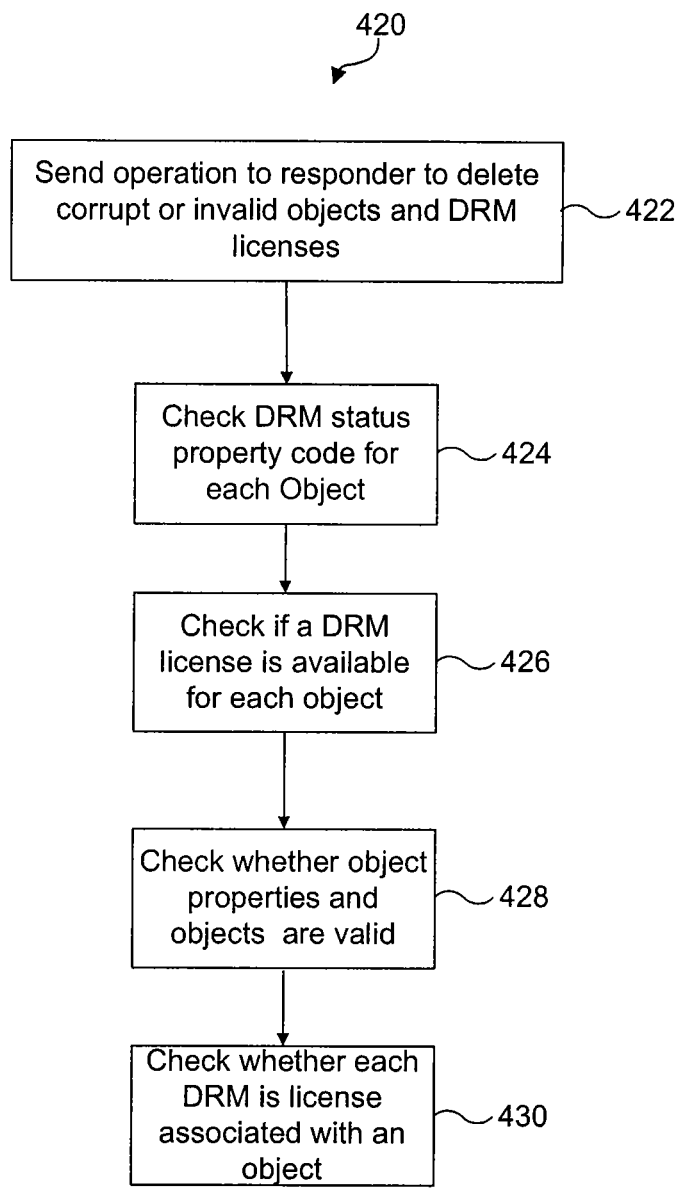
FIG. 4B illustrates an example flowchart showing steps performed to delete orphaned objects and digital rights management licenses according to an embodiment of the invention.

FIG. 4B illustrates an example flowchart 420 showing steps performed to delete orphaned objects and digital rights management licenses according to an embodiment of the invention.

In step 422, the initiator sends an operation to the responder to delete corrupt, invalid and/or orphaned objects and digital rights management licenses. For example, initiator 102 sends the operation shown in table 8 to responder 104 to delete corrupt, invalid and/or orphaned objects and digital rights management licenses in memory 110 and/or disk drive 114 of responder 104.

TABLE 8

| | |
|---|---|
| Operation Code | 0x00F3 |
| Operation Parameter 1 | None |
| Operation Parameter 2 | None |
| Operation Parameter 3 | None |
| Operation Parameter 4 | None |
| Operation Parameter 5 | None |
| Data | None |
| Data Direction | None |
| ResponseCode Options | OK, Parameter_Not_Supported |
| Response Parameter 1 | None |
| Response Parameter 2 | None |
| Response Parameter 3 | None |
| Response Parameter 4 | None |
| Response Parameter 5 | None |

In step 424, the responder checks whether the digital rights management status code is set for each object stored in its memory and deletes the objects that do not have a digital rights management code set. For example, responder 104 checks the item status code for each object stored in its memory 110 and/or disk drive 114 and deletes the objects that do not have a DRM status property code set.

In step 426, the responder checks whether a digital rights management license is available for each object stored in its memory and deletes objects that do not have a digital rights management license. For example, responder 104 checks whether a digital rights management license is available for each object stored in its memory 110 and/or disk drive 114 and deletes the objects that do not have a DRM license associated with them.

In step 428, the responder checks whether the object and associated object properties are valid for each object and associated object property stored in its memory and deletes invalid or corrupt objects and/or associated object properties. For example, responder 104 checks whether each object and each associated property is in its memory 110 and/or disk drive 114 and deletes invalid or corrupt objects and/or associated object properties.

In step 430, the responder checks whether each DRM license stored in its memory is associated with an object and deletes unassociated DRM licenses. For example, responder 104 checks whether each DRM license stored in its memory 110 and/or disk drive 114 is associated with an object and deletes digital rights management licenses that are not associated with objects.

Figure 4C:
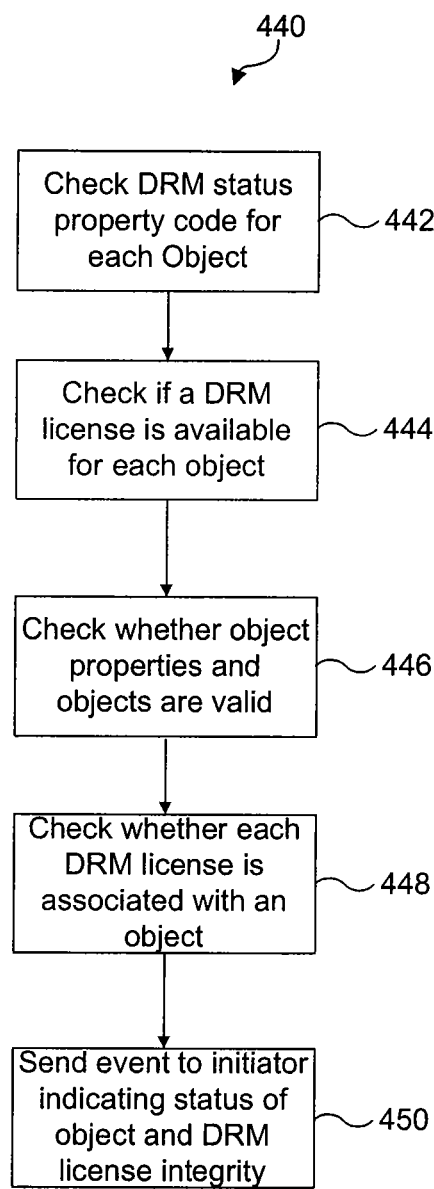
FIG. 4C illustrates an example flowchart showing steps performed by a responder to indicate corrupt, invalid or orphaned objects and/or digital rights management licenses according to an embodiment of the invention.

FIG. 4C illustrates an example flowchart 440 showing steps performed by a responder to indicate corrupt, invalid or orphaned objects and/or digital rights management licenses according to an embodiment of the invention.

In step 442, the responder checks whether the digital rights management status code is set for each object stored in its memory and records the object identification for any offending objects in the object integrity database shown below in table 7. For example, responder 104 checks the item status code for each object stored in its memory 110 and/or disk drive 114 and records the object identifications for objects that do not have a DRM status property code set for each object.

In step 444, the responder checks whether a digital rights management license is available for each object stored in its memory. For example, responder 104 checks whether a digital rights management license is available for each object stored in its memory 110 and/or disk drive 114 and records the object ID of objects that do not have a DRM license associated with them in table 7.

In step 446, the responder checks whether the object and associated object properties are valid for each object and associated object property stored in its memory. For example, responder 104 checks whether each object and each associated property is in its memory 110 and/or disk drive 114 and records the object identification for invalid or corrupt objects and/or associated object properties.

In step 448, the responder checks whether each DRM license stored in its memory is associated with an object and records a DRM license identification for DRM licenses that do not have an associated object. For example, responder 104 checks whether each DRM license stored in its memory 110 and/or disk drive 114 is associated with an object and records a digital rights management license identification for digital rights management licenses that are not associated with objects.

In step 450, the responder sends an event to the initiator indicating status of object and DRM license integrity. In an embodiment, the responder sends the event with the object integrity database in table 7. For example, responder 102 sends an event as shown in table 9 with the object integrity database in table 7 to initiator 102 to indicate status of digital rights management licenses and object in memory 110 and/or disk drive 114.

TABLE 9

| | |
|---|---|
| Event Code | 0x00E4 |
| Event Parameter 1 | None |
| Event Parameter 2 | None |

In an embodiment, initiators and responders store digital rights management information in a dataset as illustrated in table 10 below.

TABLE 10

| Dataset field | Field order | Length (bytes) | Datatype |
|---|---|---|---|
| Manufacturer | 1 | variable | String |
| Serial Number | 2 | variable | String |
| Model | 3 | variable | String |
| Version | 4 | variable | String |
| DRM friendly name | 5 | variable | String |
| DRM Operations Supported | 6 | variable | AUINT16 |
| DRM Events Supported | 7 | variable | AUINT16 |
| DRM Capabilities | 8 | variable | String |
| DRM Store Capacity in bytes | 9 | 4 | UINT32 |

In an embodiment, responder 104 sends digital rights management information for objects stored in memory 110 and/or disk driver 114 by including the DRM information dataset with the operation shown below in table 11.

TABLE 11

| | |
|---|---|
| Operation Code | 0x00F4 |
| Operation Parameter 1 | None |
| Operation Parameter 2 | None |
| Operation Parameter 3 | None |
| Operation Parameter 4 | None |
| Operation Parameter 5 | None |
| Data | DrmInfo dataset |
| Data Direction | R->I |
| ResponseCode Options | OK, Parameter_Not_Supported |
| Response Parameter 1 | None |
| Response Parameter 2 | None |
| Response Parameter 3 | None |
| Response Parameter 4 | None |
| Response Parameter 5 | None |

In an embodiment, a media player application running on a processor 108 of initiator 102 sends the operation shown in table 12 to a responder 104 requesting the amount of free space available to store digital rights management information. The operation in table 12 specifies the response parameter to return digital rights management information.

TABLE 12

| | |
|---|---|
| Operation Code | 0x00F5 |
| Operation Parameter 1 | None |
| Operation Parameter 2 | None |
| Operation Parameter 3 | None |
| Operation Parameter 4 | None |
| Operation Parameter 5 | None |
| Data | None |
| Data Direction | R->I |
| ResponseCode Options | OK, Parameter_Not_Supported |
| Response Parameter 1 | DRM free space in bytes |
| Response Parameter 2 | None |
| Response Parameter 3 | None |
| Response Parameter 4 | None |
| Response Parameter 5 | None |

In an embodiment, a responder 104 using the event in table 13 indicates to initiator 102 that the space allocated in memory 110 and/or disk drive 114 for storing digital rights management information is full.

TABLE 13

| | |
|---|---|
| Event Code | 0x00E5 |
| Event Parameter 1 | None |
| Event Parameter 2 | None |
| Event Parameter 3 | None |

7. EXTENSIONS FOR SYSTEM INFORMATION EXCHANGE

System information is used by media player applications running on initiator 102 and responder 104 to exchange system information enabling them to adapt and configure to various system conditions, system revision levels, and product version features. An example of a system information dataset used to store system information is shown below in table 14.

TABLE 14

| DataSet field | Field order | Length (bytes) | Datatype |
|---|---|---|---|
| Protocol (USB, TCP/IP, WIFI, etc.) | 1 | 2 | UINT16 |
| USB device descriptor | 2 | variable | UINT8 |
| Driver Vendor Number | 3 | 4 | UINT32 |
| Driver Vendor ID | 4 | 4 | UINT32 |
| Operating System Name (i.e. Windows Vista, Windows XP, Symbian, Lilnux, MacOS, etc.) | 5 | variable | String |
| Operating System Revision level | 6 | variable | String |
| Operating System Patch Information | 7 | variable | String |
| Hardware information (Manufacturer, make, model, capabilities) | 8 | variable | String |
| Internationalization (Country, Language, Time zone) | 9 | variable | String |
| Media Player Name | 10 | variable | String |
| Media Player Version | 11 | variable | String |
| Miscellaneous | 12 | variable | String |

In an embodiment, an initiator 102 may request the responder 104 to provide system information by sending the operation illustrated in table 15 below. Typically this operation is performed by a media player application running on processor 108 of initiator 102 when a successful connection 200 has been established with a responder 104 and prior to initiation of any sessions 202 as described above with reference to FIG. 2B. In response, the responder 104, populates and returns the system information shown in table 14.

TABLE 15

| | |
|---|---|
| Operation Code | 0x00F6 |
| Operation Parameter 1 | None |
| Operation Parameter 2 | None |
| Operation Parameter 3 | None |
| Operation Parameter 4 | None |
| Operation Parameter 5 | None |
| Data | SystemInfo dataset |
| Data Direction | R->I |
| ResponseCode Options | OK, Operation_Not_Supported |
| Response Parameter 1 | None |
| Response Parameter 2 | None |
| Response Parameter 3 | None |
| Response Parameter 4 | None |
| Response Parameter 5 | None |

In an embodiment, the initiator 104 populates and sends the system information dataset shown in table 14 in the operation shown in table 16 when a successful connection 200 has been established and prior to initiation of any sessions 202 as described above with reference to FIG. 2B. The operations in table 16 allows the initiator 102 and responder 104 to adjust their internal logic and programs based on the information in system information dataset in table 14.

TABLE 16

| | |
|---|---|
| Operation Code | 0x00F7 |
| Operation Parameter 1 | None |
| Operation Parameter 2 | None |
| Operation Parameter 3 | None |
| Operation Parameter 4 | None |
| Operation Parameter 5 | None |
| Data | SystemInfo dataset |
| Data Direction | I–>R |
| ResponseCode Options | OK, Operation_Not_Supported |
| Response Parameter 1 | None |
| Response Parameter 2 | None |
| Response Parameter 3 | None |
| Response Parameter 4 | None |
| Response Parameter 5 | None |

The MTP specification describes an operation to request a device information dataset (which is defined in the MTP specification) from the responder 104 but does not describe an operation to send a device information dataset from the initiator 102 to the responder 104. In an embodiment, the initiator 102, using the operation shown in table 17 below, sends the device information dataset to the responder 104.

TABLE 17

| | |
|---|---|
| Operation Code | 0x00B1 |
| Operation Parameter 1 | None |
| Operation Parameter 2 | None |
| Operation Parameter 3 | None |
| Operation Parameter 4 | None |
| Operation Parameter 5 | None |
| Data | DeviceInfo dataset |
| Data Direction | I–>R |
| ResponseCode Options | OK, Operation_Not_Supported |
| Response Parameter 1 | None |
| Response Parameter 2 | None |
| Response Parameter 3 | None |
| Response Parameter 4 | None |
| Response Parameter 5 | None |

In an embodiment, a responder 104 receives and stores a populated system information dataset as shown in table 14. The operation illustrated in table 18 enables a responder 104 to determine whether a media player application 102 responder 104 can properly identify the initiator 102 by sending the stored initiator system information dataset back to the initiator 102.

TABLE 18

| | |
|---|---|
| Operation Code | 0x00F8 |
| Operation Parameter 1 | None |
| Operation Parameter 2 | None |
| Operation Parameter 3 | None |
| Operation Parameter 4 | None |
| Operation Parameter 5 | None |
| Data | SystemInfo dataset of Initiator as stored on Responder |
| Data Direction | R–>I |
| ResponseCode Options | OK, Operation_Not_Supported |
| Response Parameter 1 | None |
| Response Parameter 2 | None |
| Response Parameter 3 | None |
| Response Parameter 4 | None |
| Response Parameter 5 | None |

8. EXTENSIONS FOR PROPERTIES

In an embodiment, subsequent to the object integrity check described above with reference to FIG. 4A, the property in table 19 below may be used to enumerate device property codes which are corrupted for a given object stored in memory 110 and/or disk drive 114 of responder 104.

TABLE 19

| Field name | Field order | Size (bytes) | Datatype | Value |
|---|---|---|---|---|
| PropertyCode | 1 | 2 | UINT16 | 0xDD74 |
| Datatype | 2 | 2 | UINT16 | 0x0004 (UINT16) |
| Get/Set | 3 | 1 | UINT8 | 0x01 (GET/SET) |
| DefaultValue | 4 | | | 0x0000 |
| GroupCode | 5 | 4 | UINT32 | Device-defined |
| FormFlag | 6 | 1 | UINT8 | 0x02 Enumeration form |

9. EXTENSIONS FOR SECURITY, INTEGRITY AND PROTOCOL CHECKS

In an embodiment, a responder 104 sends an event when code or data tampering has been detected by the responder's security system (not shown), rendering the responder 104 insecure for digital rights management purposes.

Figure 5A:
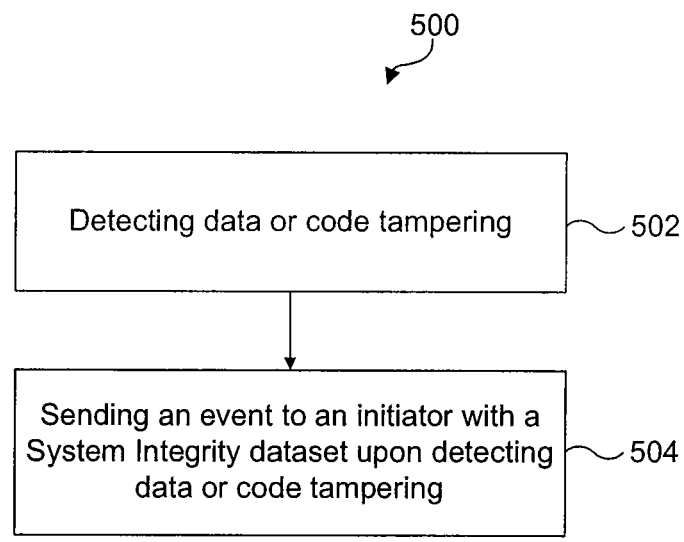
FIG. 5A illustrates a flowchart showing steps performed in response to detecting compromise of a digital rights management system of a responder.

FIG. 5A illustrates a flowchart 500 showing steps performed in response to detecting compromise of a digital rights management system of responder 104.

In step 502, a responder detects code or data tampering of objects and/or digital rights management licenses. For example, responder 104 detects when code or data stored in memory 110 or disk drive 114 has been compromised by performing security checks described above with reference to FIG. 4A.

In step 504, the responder sends an event to the initiator with an optional system integrity dataset indicating the lapse in system security. For example, responder 104, sends the event indicated in table 20 to initiator 102.

TABLE 20

| | |
|---|---|
| Event Code | 0x00E6 |
| Event Parameter 1 | None |
| Event Parameter 2 | None |
| Event Parameter 3 | None |

In an embodiment, responder 104 includes the dataset in table 21 in the event shown in table 20. The system integrity dataset in table 2 indicates the integrity status for DRM licenses.

TABLE 21

| Dataset field | Field order | Length (bytes) | Datatype |
|---|---|---|---|
| DRM secret integrity status | 1 | 2 | UINT16 (Status) |
| DRM code integrity status | 2 | 2 | UINT16 (Status) |
| MTP code integrity status | 3 | 2 | UINT16 (Status) |
| Platform code integrity status | 4 | 8 | UINT16 (Status) |
| Application code integrity status | 5 | 8 | UINT16 (Status) |
| Error message | 8 | Variable | String |

In an embodiment, a status code of 0x0001 may indicate that the component has been compromised, a status code of 0x0002 may indicate that the component is secure and a status code of 0x0003 may indicate that the component status is unknown.

In an embodiment, a media player application running on initiator 102, upon receiving the event may alert a user and/or not send protected content to the responder 104.

In an embodiment, the initiator 102 needs to determine whether the responder 104 is secure and whether digital rights management licenses can be transferred to the responder 104.

Figure 5B:
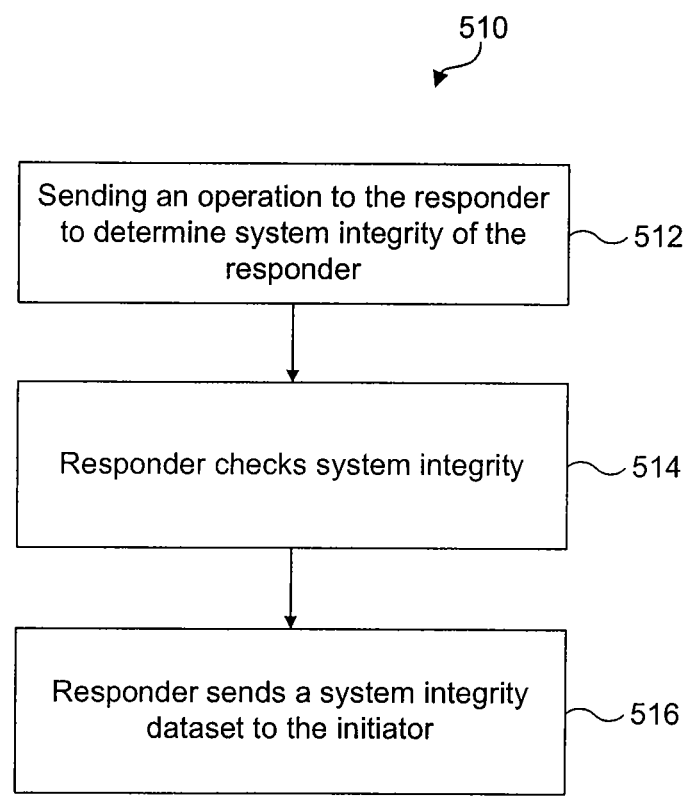
FIG. 5B illustrates a flowchart showing steps performed to check the system integrity of a responder according to an embodiment of the invention.

FIG. 5B illustrates a flowchart 510 showing steps performed to check the system integrity of a responder according to an embodiment of the invention.

In step 512, an initiator sends an operation to the responder to determine the system integrity of the responder. For example, initiator 102 sends the operation illustrated in table 22 to responder 104 to determine whether responder 104 is secure for transmission of digital rights management licenses or other secure applications.

TABLE 22

| | |
|---|---|
| Operation Code | 0x00F9 |
| Operation Parameter 1 | None |
| Operation Parameter 2 | None |
| Operation Parameter 3 | None |
| Operation Parameter 4 | None |
| Operation Parameter 5 | None |
| Data | SystemIntegrity dataset |
| Data Direction | R->I |
| ResponseCode Options | OK, Operation_Not_Supported, Session_Not_Open, Invalid_TransactionID, Device_Busy |
| Response Parameter 1 | None |
| Response Parameter 2 | None |
| Response Parameter 3 | None |
| Response Parameter 4 | None |
| Response Parameter 5 | None |

In step 514, a responder checks its system integrity. For example, responder 104 performs integrity check of digital rights management files in memory 108 and/or disk drive 110, integrity check of executable digital rights management library system code and integrity check of executable MTP stack code or other platform code. The results of the security checks performed by responder 104 are stored in, for example, the dataset shown in table 21.

In step 516, the responder sends the system integrity dataset to the initiator. For example, responder 104 sends the dataset shown in table 21 and populated above in step 514 to initiator 102.

Figure 5C:
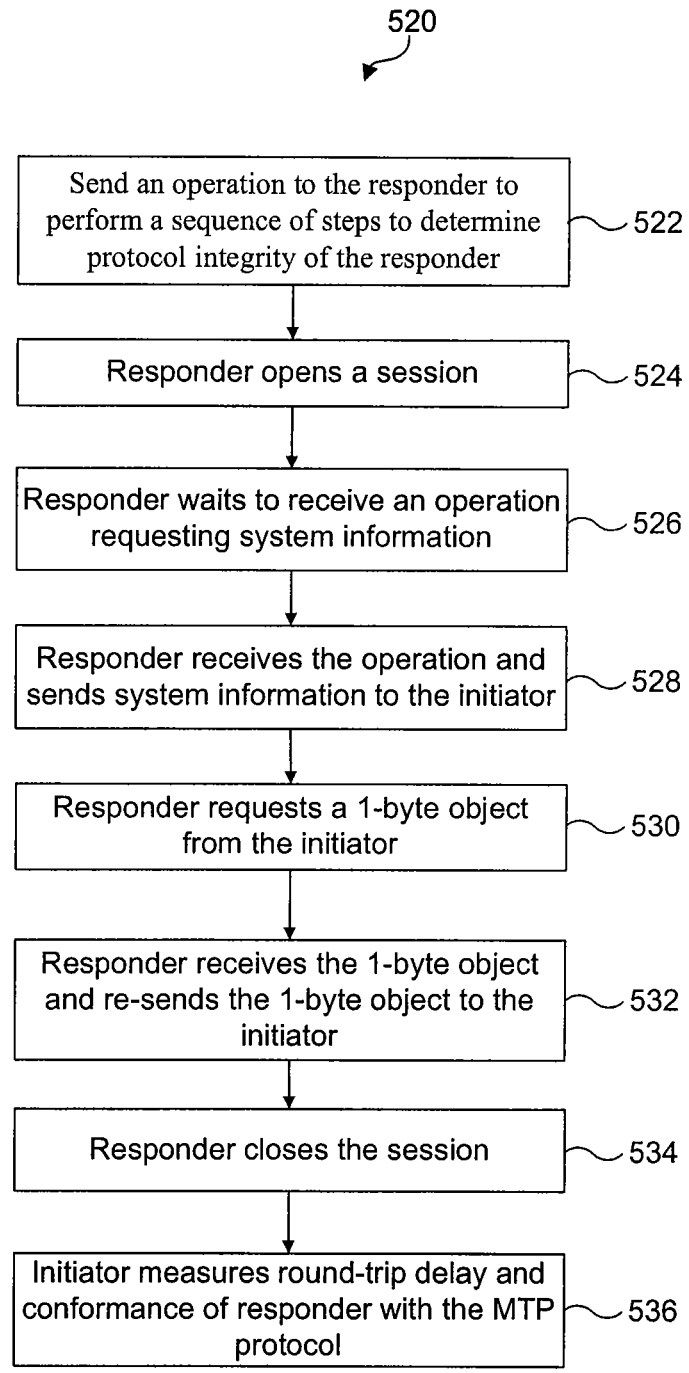
FIG. 5C illustrates a flowchart showing steps performed by an initiator to determine the protocol integrity of a responder according to an embodiment of the invention.

FIG. 5C illustrates a flowchart 520 showing steps performed by the initiator to determine the protocol integrity of a responder according to an embodiment of the invention.

In step 522 the initiator sends an operation to the responder to determine the protocol integrity of the responder. For example, initiator 102 sends the operation illustrated in table 23 to determine the protocol integrity of responder 104.

TABLE 23

| | |
|---|---|
| Operation Code | 0x00FA |
| Operation Parameter 1 | None |
| Operation Parameter 2 | None |
| Operation Parameter 3 | None |
| Operation Parameter 4 | None |
| Operation Parameter 5 | None |
| Data | None |
| Data Direction | R->I |
| ResponseCode Options | OK, Operation_Not_Supported, Session_Not_Open, Invalid_TransactionID, Device_Busy |
| Response Parameter 1 | None |
| Response Parameter 2 | None |
| Response Parameter 3 | None |
| Response Parameter 4 | None |
| Response Parameter 5 | None |

In step 524, in response to receiving the operation from step 522, the responder opens a session between the initiator and the responder. For example, responder 104 opens a session 202 with initiator 102.

In step 526, the responder waits to receive an operation from the initiator requesting system information. For example, responder 104 waits to receive an operation as shown above in table 15 from initiator 102 requesting system information of responder 104.

In step 528, responder receives an operation from the initiator requesting system information and sends the requested system information to the initiator. For example, the responder 104 receives the operation shown in table 15 and sends the system information dataset shown in table 14 to initiator 102.

In step 530, the responder requests a byte object from the initiator. For example, responder 104 requests an object of a specific size from initiator 102.

In step 532, the responder receives the object of the specified size from the initiator and resends the same object back to the initiator. For example, responder 104 receives an object from initiator 102 of a specific size and resends the object to initiator 102. In an embodiment, the size of the object requested by the responder may be arbitrary.

In step 534, responder 104 closes the session with initiator 102. For example, responder 104 closes the session 202 with initiator 102.

In step 536, the initiator measures a round trip delay of the object sent to the responder in step 530 and received back from the responder in step 532. In an embodiment, the initiator also determines the conformance of the responder to a protocol, for example, a Media Transfer Protocol (MTP). For example, initiator 102 measures the round trip delay and conformance of the responder 104 to the MPT protocol.

10. EXAMPLE GENERAL PURPOSE COMPUTER SYSTEM

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
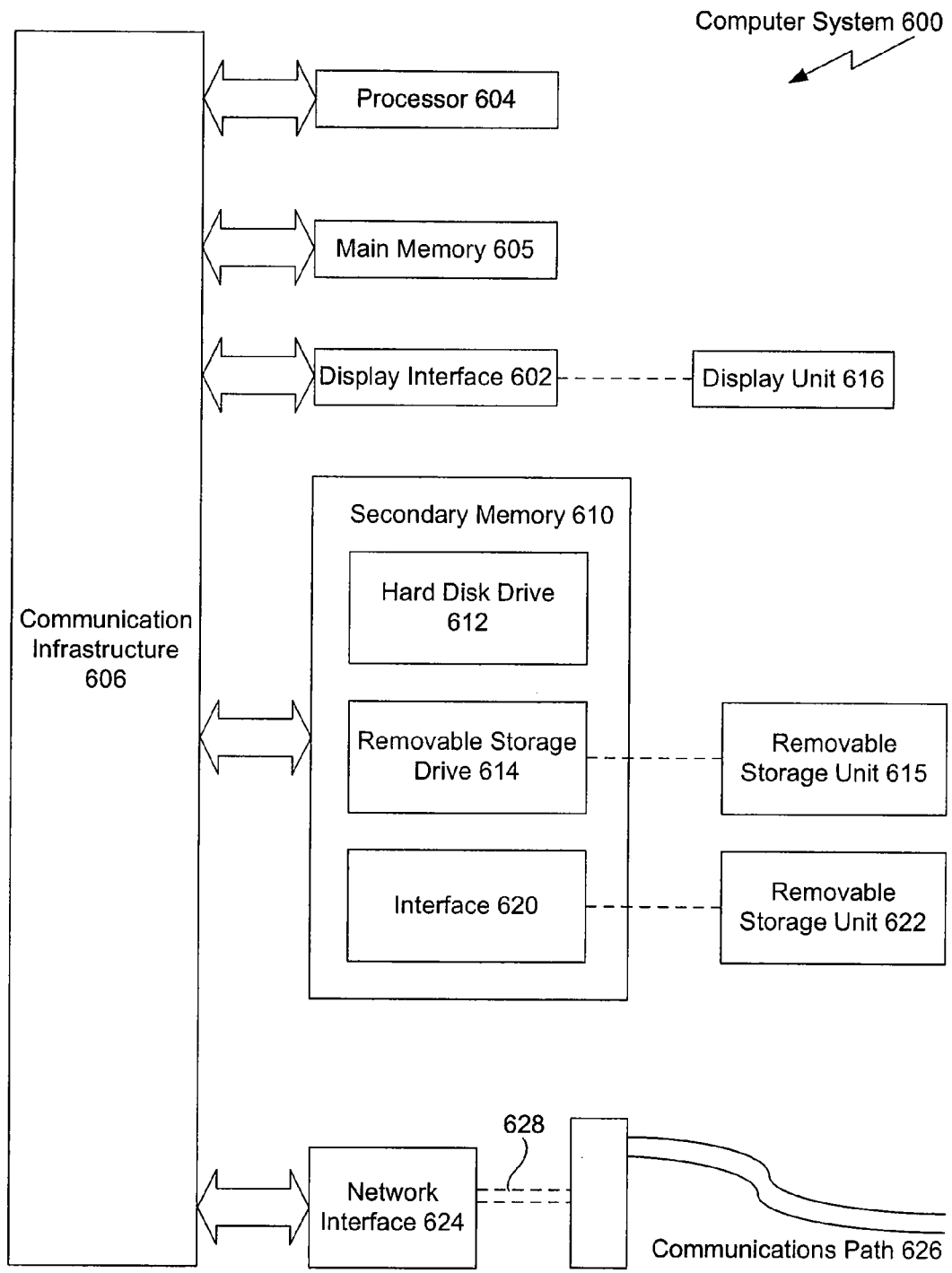
FIG. 6 is a block diagram of a computer system on which the present invention can be implemented.

In fact, in one embodiment, the invention is directed toward one or more computer systems capable of carrying out the functionality described herein. An example of a computer system 600 is shown in FIG. 6.

Computer system 600 includes one or more processors, such as processor 604. Processor 604 is connected to a communication infrastructure 606 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from communication infrastructure 606 (or from a frame buffer not shown) for display on display unit 616.

Computer system 600 also includes a main memory 605, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 615 in a well known manner. Removable storage unit 615 represents a floppy disk, magnetic tape, optical disk, etc. which is read by and written to by removable storage drive 614. As will be appreciated, removable storage unit 615 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 615 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 615 and interfaces 620, which allow software and data to be transferred from removable storage unit 615 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 605 and/or secondary memory 610. Computer programs may also be received via communications interface 624. Such computer programs, when executed, enable computer system 600 to perform the features of the present invention, as discussed herein. In particular, the computer programs, when executed, enable processor 604 to perform the features of the present invention. Accordingly, such computer programs represent controllers of computer system 600.

In an embodiment where the invention is implemented using software, the software may be stored in a computer program product and loaded into computer system 600 using removable storage drive 614, hard drive 612 or communications interface 624. The control logic (software), when executed by processor 604, causes processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

11. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method to exchange media player information between an initiator and a media player operating under a Media Transport Protocol (MTP), comprising:
opening a session with the media player;
exchanging one or more of device and system information with the media player; and
sending, one of an operation or event that describes features of a media player application running on a processor of the initiator, to the media player.

2. The method of claim 1, further comprising receiving an event from the media player that requests the initiator to provide information on the media player application running on the processor of the initiator.

3. The method of claim 2, wherein in response to the event, the initiator sends an operation to the media player to provide media player application information.

4. The method of claim 3, wherein the operation includes a dataset that has one or more of manufacturer name, version identifier, serial number, model number, PC Media player friendly name, supported operations and supported events.

5. The method of claim 1, wherein the receiving further comprises receiving an event from the media player to reset a media player application running on the initiator.

6. The method of claim 1, wherein the receiving further comprises receiving an event from the media player in response to a firmware upgrade of the media player.

7. The method of claim 6, wherein the event causes the initiator to close all open sessions, perform a soft reset of its MTP stack, and query the media player for transport capabilities including one or more of Universal Serial Bus (USB) serial numbers, product identification numbers, model number, product name and changed system capabilities of the media player as a result of the firmware upgrade of the media player.

8. A method to efficiently manage sessions between an initiator and a responder operating under a data transfer protocol, comprising:
   opening a session between an initiator and a responder; and sending one or more of initiator system information and media player application information to the responder;
   requesting one or more of device information, system information, and digital rights management (DRM) information from the responder;
   requesting the responder to perform one or more of a system integrity check and an object integrity check, wherein the object integrity check includes checking integrity of object metadata and DRM licenses stored by the responder, and the system integrity check includes determining whether the responder is secure for transfer of DRM licenses; and
   conducting multiple transaction with the responder without repeating the opening, sending or requesting at the start of each transaction;
   wherein each transaction comprises one of an operation or an event; and
   wherein said operation includes one or more of a dataset, response code, operation parameter and response parameter.

9. The method of claim 8, wherein the protocol is a Media Transfer Protocol (MTP).

10. The method of claim 8, wherein the checking of DRM licenses includes checking whether a DRM code is set for each object stored in a memory of the responder and recording an object identification for objects that do not have a DRM status property code set for each object.

11. The method of claim 8, wherein the determining of whether the responder is secure for transfer of DRM licenses is determined by checking integrity of DRM files in a memory of the responder, checking integrity of executable DRM library system code and integrity of executable MTP stack code, storing the results of the integrity check in a database, and transmitting the database to the initiator.

12. A method to exchange media player information between an initiator and a media player operating under a Media Transport Protocol (MTP), comprising:
   opening a session with the initiator;
   exchanging one or more of device and system information with the initiator; and
   receiving at the media player one of an operation or event that describes features of a media player application running on a processor of the initiator.

13. The method of claim 12, further comprising sending an event to the initiator requesting the initiator to provide information on the media player application running on the processor of the initiator.

14. The method of claim 13, wherein in response to the event, the receiver media player receives an operation from the initiator that provides information on the media player application running on the processor of the initiator.

15. The method of claim 14, wherein the operation includes a dataset that has one or more of manufacturer name, version identifier, serial number, model number, PC Media player friendly name, supported operations and supported events.

16. The method of claim 13, wherein the sending further comprises sending an event to the initiator to reset a media player application running on the initiator.

17. The method of claim 13, wherein the sending further comprises sending an event to the initiator in response to a firmware upgrade of the media player.

18. The method of claim 17, wherein the event causes the initiator to close all open sessions, perform a soft reset of its MTP stack, and query the media player for transport capabilities including one or more of Universal Serial Bus (USB) serial numbers, product identification numbers, model number, product name and changed system capabilities of the media player as a result of the firmware upgrade of the media player.

* * * * *

UNITED STATES PATENT AND TRADEMARK OFFICE
CERTIFICATE OF CORRECTION

| | | |
|---|---|---|
| PATENT NO. | : 8,626,931 B2 | Page 1 of 1 |
| APPLICATION NO. | : 11/967990 | |
| DATED | : January 7, 2014 | |
| INVENTOR(S) | : Scott Krig | |

It is certified that error appears in the above-identified patent and that said Letters Patent is hereby corrected as shown below:

In the Claims:

Column 20, line 17, please replace "the receiver media player" with --the media player--.

Signed and Sealed this
Thirteenth Day of May, 2014

Michelle K. Lee
*Deputy Director of the United States Patent and Trademark Office*